US010742403B2

(12) United States Patent
Schubert et al.

(10) Patent No.: US 10,742,403 B2
(45) Date of Patent: Aug. 11, 2020

(54) ACCESS KEY TRANSMISSION OVER PERSONAL AREA NETWORKS IN VEHICLES

(71) Applicant: Ford Global Technologies, LLC, Dearborn, MI (US)

(72) Inventors: Jochen Schubert, Westland, MI (US); Thomas Nelson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/216,406

(22) Filed: Dec. 11, 2018

(65) Prior Publication Data

US 2020/0186333 A1 Jun. 11, 2020

(51) Int. Cl.
| | |
|---|---|
| G07C 9/00 | (2020.01) |
| H04L 9/08 | (2006.01) |
| H04W 12/00 | (2009.01) |
| H04W 12/04 | (2009.01) |
| B60R 25/24 | (2013.01) |

(52) U.S. Cl.
CPC .......... *H04L 9/0825* (2013.01); *B60R 25/241* (2013.01); *G07C 9/00309* (2013.01); *G07C 9/00896* (2013.01); *H04W 12/003* (2019.01); *H04W 12/04071* (2019.01); *G07C 2009/0042* (2013.01)

(58) Field of Classification Search
None
See application file for complete search history.

(56) References Cited

U.S. PATENT DOCUMENTS

| 9,100,793 | B2* | 8/2015 | Johnson | H04W 4/025 |
|---|---|---|---|---|
| 9,250,327 | B2* | 2/2016 | Kelley | H03M 7/30 |
| 9,418,022 | B2* | 8/2016 | Nagai | G06F 12/14 |
| 2008/0224823 | A1* | 9/2008 | Lawson | G06F 21/34 |
| | | | | 340/5.8 |
| 2009/0136035 | A1 | 5/2009 | Lee | |

FOREIGN PATENT DOCUMENTS

CN 205945907 U 2/2017

OTHER PUBLICATIONS

Ellisys, "Secure Simple Pairing Explained," Ellisys Bluetooth Expert Notes, Ellisys 2011, 8 Pages.

* cited by examiner

*Primary Examiner* — K. Wong
(74) *Attorney, Agent, or Firm* — Michael Spenner; Brooks Kushman, P.C.

(57) ABSTRACT

A vehicle includes a controller. The controller is configured to send a nonce encrypted according to a symmetric encryption key. The nonce is sent responsive to receiving a pair request over a personal area network from a nomadic device outside the vehicle. The controller is further configured to initialize a secure connection using a random key and permit vehicle access according to data received via the secure connection. The initialization is responsive to receiving a concatenation of the random key and an incrementation of the nonce encrypted with the symmetric encryption key.

17 Claims, 3 Drawing Sheets

US 10,742,403 B2

ACCESS KEY TRANSMISSION OVER PERSONAL AREA NETWORKS IN VEHICLES

TECHNICAL FIELD

This disclosure relates to secure exchange of keys in vehicles.

BACKGROUND

Vehicle access and ignition keys are becoming virtualized. Wireless connections for virtual key exchange may be performed over a personal area network (PAN) between a nomadic device and the vehicle. The PAN communications may require a PIN exchange, but a vehicle may be unable to display the PIN or accept PIN input prior to authorized access and entry. Unsecured PIN exchange may allow for eavesdropping of PAN communications and disclosure of the access and ignition keys.

SUMMARY

A vehicle includes a controller. The controller is configured to send a nonce encrypted according to a symmetric encryption key. The nonce is sent responsive to receiving a pair request over a personal area network from a nomadic device outside the vehicle. The controller is further configured to initialize a secure connection using a random key and permit vehicle access according to data received via the secure connection. The initialization is responsive to receiving a concatenation of the random key and an incrementation of the nonce encrypted with the symmetric encryption key.

A vehicle includes a controller. The controller is configured to send a predetermined incrementation of a nonce concatenated with a random key encrypted according to a symmetric encryption key. The transmission is responsive to receiving the nonce encrypted according to the symmetric encryption key associated with a key identifier. The controller is further configured to operate the vehicle according to commands received from a secure connection with the device based on the random key over a personal area network. The operation is responsive to pairing with the device sending the nonce.

A method by a controller includes sending a nonce encrypted according to a symmetric encryption key. The nonce is sent responsive to receiving a pair request over a personal area network from a nomadic device outside the vehicle. The method further includes initializing a secure connection using a random key and permit vehicle access according to data received via the secure connection. The initialization is responsive to receiving a concatenation of the random key and an incrementation of the nonce encrypted with the symmetric encryption key.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As vehicle access and ignition keys become more virtualized, secure exchange between vehicles and mobile or nomadic devices storing the virtual keys becomes necessary. The secure exchange may occur over a personal area network (PAN) that does not require or have access to the Internet. PAN communications are generally established via visual exchange of a random PIN between the devices attempting to join the network from a display within the vehicle. Prior to vehicle access, customary visual exchanges are not available. As such, secondary access may be authorized by the vehicle owner via a key distribution server. The key distribution server may distribute a pre-shared symmetric key along with the vehicle access key such that a secure PAN connection is established between the vehicle and the secondary user. The secondary user can then use the secure connection to exchange vehicle access keys or other information to gain access to the vehicle. Indeed, a secondary user can securely exchange vehicle access keys through a secured PAN connection by exchanging a random PIN via a pre-shared symmetric encryption key without access to vehicle display systems.

Figure 1:
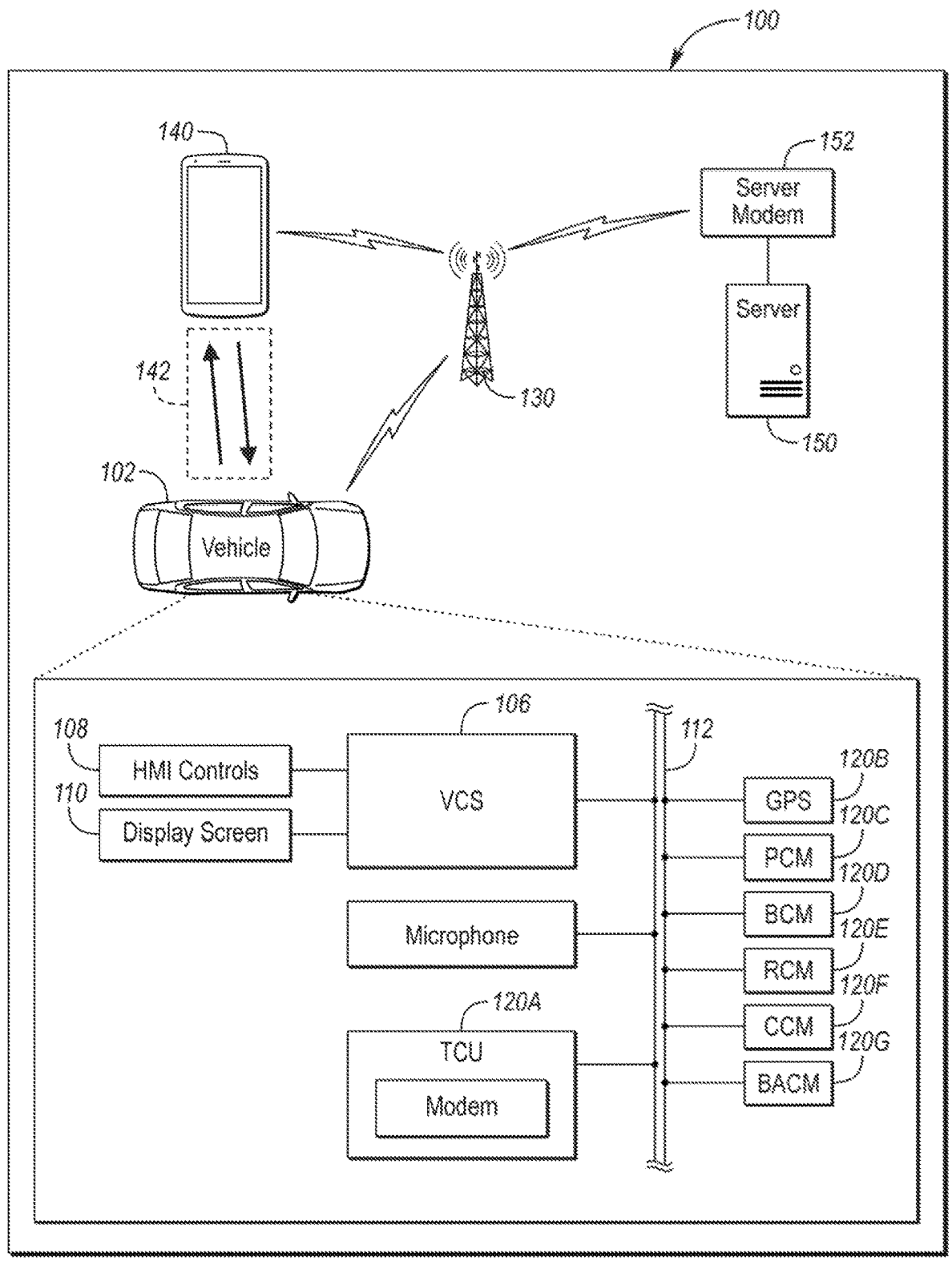
FIG. 1 is a schematic diagram of a vehicle having communications systems.

FIG. 1 illustrates an example system 100 including a vehicle 102. The vehicle 102 may include a vehicle computing system (VCS) 106 configured to communicate over a wide-area network using a telematics control unit (TCU) 120A. The TCU 120A may have various modems 122 configured to communicate over respective communications paths and protocols. For example, the TCU 120A may include a PAN modem and a 4G modem. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC® system provided by FORD MOTOR COMPANY of Dearborn, Mich.

The VCS 106 may further include various types of computing apparatus in support of performance of the functions of the VCS 106 described herein. In an example, the VCS 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 106 may be configured to communicate with TCU 120A. The TCU 120A may include a plurality of modems 122 capable of packet-switch or circuit-switched signaling. The TCU 120A may control the operation of the modems 122 such that a suitable communication path is used. The modems may be configured to communicate over a variety of communications paths 130. The paths may be configured with circuit-switched, packet-switched, signaling, or combination thereof. Packet-switched communication paths may be Internet Protocol (IP)-based or use packet-based switching to transfer information. For example, the packet-switched communication may be long-term evolution (LTE) communications. In some circumstances the circuit-switched communication path may be SIGTRAN or another implement, carrying circuit-switched signaling information over IP. The underlying signaling information is, however, still formatted under the circuit-switched protocol.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS 106 may also drive or otherwise communicate with one or more displays 110 configured to provide visual output to vehicle occupants, e.g., by way of a video controller. The vehicle 102 may have a separate BLUETOOTH controller that is specifically for vehicle 102 access or ignition. That is, some BLUETOOTH connections may have access to displays and interfaces, while other connections do not. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120A (which may not be present in some configurations), a global positioning system (GPS) module 120B configured to provide current vehicle 102 location and heading information, and various other vehicle ECUs configured to cooperate with the VCS 106. As some non-limiting possibilities, the vehicle ECUs may include a powertrain control module (PCM) 120C configured to provide control of engine operating components (e.g., idle control components, fuel delivery components, emissions control components, etc.) and monitoring of engine operating components (e.g., status of engine diagnostic codes); a body control module (BCM) 120D configured to manage various power control functions such as exterior lighting, interior lighting, keyless entry, vehicle door locking and unlocking, remote start, and point of access status verification (e.g., closure status of the hood, doors and/or trunk of the vehicle 102); a radio transceiver module (RCM) 120E configured to communicate with key fobs or other local vehicle 102 devices including mobile phones and nomadic devices 140; a climate control management (CCM) 120F module configured to provide control and monitoring of heating and cooling system components (e.g., compressor clutch and blower fan control, temperature sensor information, etc.); and a battery control module (BACM) 120G configured to monitor the state of charge or other parameters of the battery of the vehicle 102.

In an example, the VCS 106 may be configured to access the communications features of the TCU 120A by communicating with the TCU 120A over a vehicle bus 112. As some examples, the vehicle bus 112 may include a controller area network (CAN) bus, an Ethernet bus, or a MOST bus. In other examples, the VCS 106 may communicate with the distribution server 150 via a server modem 152 using the communications services of the modems 122. The distribution server 150 may include a datastore or database repository including access keys and pre-shared symmetric keys for all of the manufacture's vehicles. The distribution server 150 may include multiple access keys and symmetric keys for vehicle 102. The distribution server 150 may associate one access key with a plurality of pre-shared symmetric keys via key identifiers. The key identifiers may be defined by manufacturer makes, models, VINs, Electronic Serial Number (ESN) of vehicle ECUs, user accounts associated with the vehicle 102, and nomadic devices 140 associated with the vehicle. The distribution server 150 may receive the access keys or pre-shared keys from the vehicle 102 during manufacture or designate access keys and symmetric keys during manufacture or during use of the vehicle 102.

A shown, a nomadic device 140 may be in communication with the distribution server 150 over network infrastructure 130. The nomadic device 140 may be any type of electronic device configured for communication of access or ignition keys. The nomadic device may be a mobile phone having a touchscreen display. The nomadic device 140 may communicate indirectly with the vehicle 102 over the network infrastructure 130. The nomadic device 140 may communicate directly with the vehicle 102 via a PAN 142.

Pre-shared symmetric keys in this context are distinct from asymmetric keys. The symmetric keys may be used for encryption and decryption. Any key type may be used for vehicle access and the exchanged PIN. Any type of cipher algorithm is anticipated to be used in conjunction with any of the key types. For example, an AES cypher may be used with the symmetric keys.

Figure 2A:
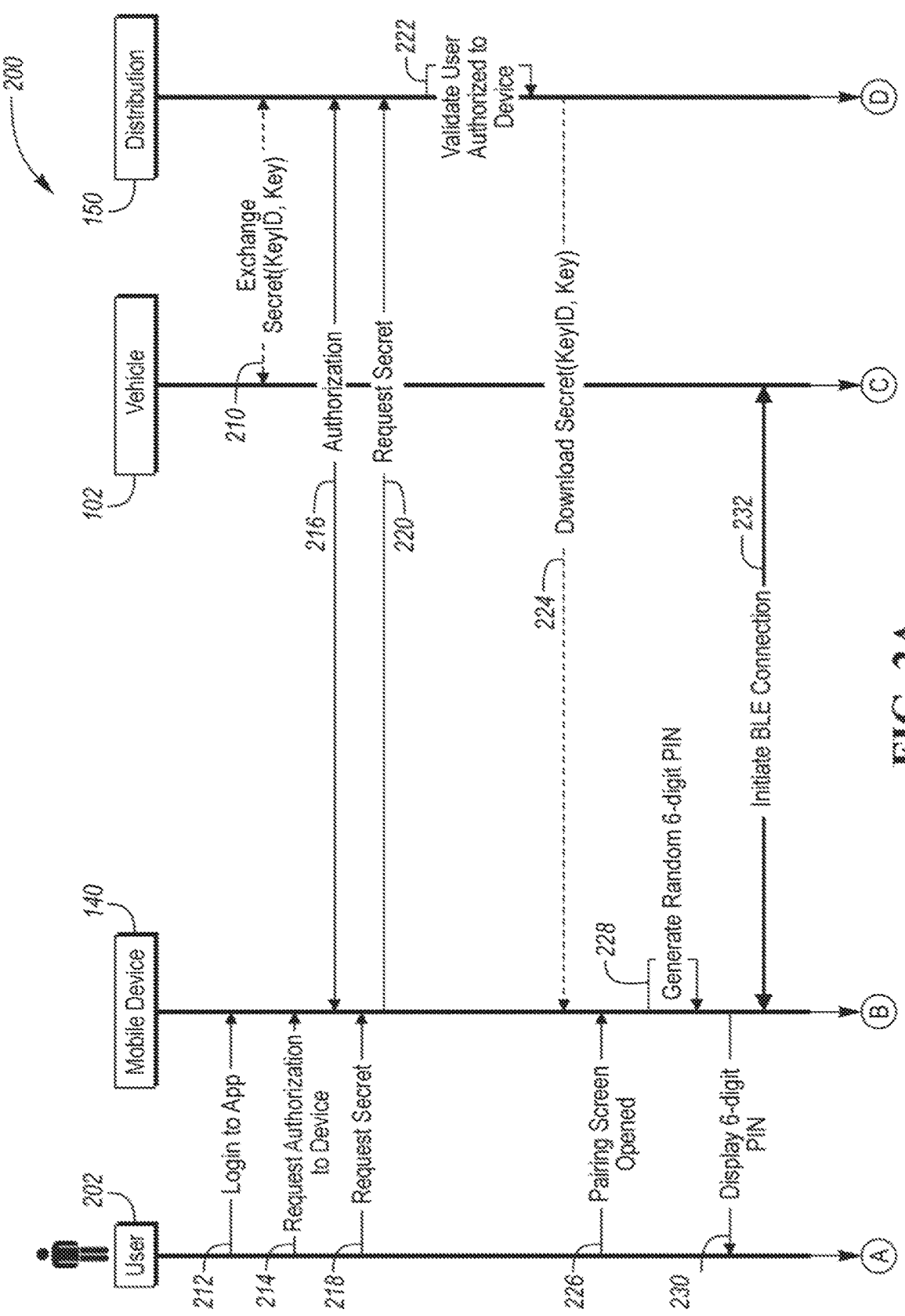
FIG. 2A is an algorithm for performing a portion of this disclosure.
Figure 2B:
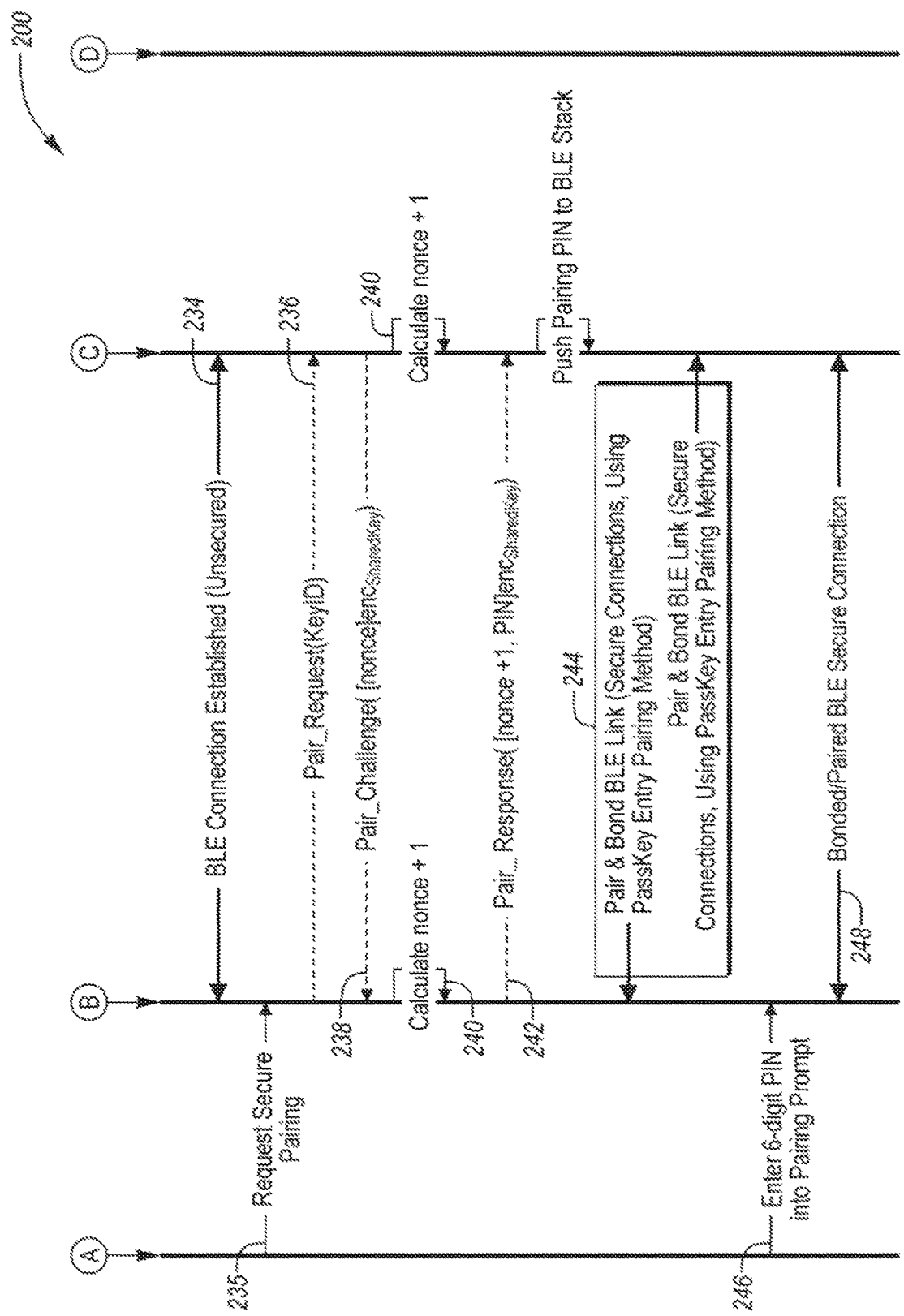
FIG. 2B is an algorithm for performing a portion of this disclosure.

Referring to FIGS. 2A-B, an algorithm 200 for secure PIN exchange over a PAN 142 for shared access keys to a vehicle is disclosed. Although only one nomadic device 140 is shown, additional nomadic devices may be used to authorize access to the keys associated with the vehicle through user accounts or services. Although a user 202 is contemplated, the nomadic device 140 may interact with the vehicle 102 over a PAN 142 without user 202 interaction. For example, the nomadic device 140 may connect and pair with the vehicle 102 automatically over the PAN 142 based on received signal strength, proximity to the vehicle, or other demands and indications. All interactions between the nomadic device 140, vehicle 102, and distribution server 150 may occur automatically. Additionally, any one of the nomadic device 140, vehicle 102, or distribution server 150 may perform any of the other enumerated steps. That is, none of the steps are designated to be performed by only one of the devices 102, 140, 150 and may be performed by any of the other devices. For example, the nomadic device 140 may receive the pair request and keyID and respond with the pair challenge—as shown in steps 236, 238.

In step 210, the vehicle 102 exchanges a secret with the distribution server 150. The secret may include the symmetric key along with a key identifier. The keyID allows more than one symmetric key to be associated with each vehicle, enabling one or many access keys to be used along with different symmetric keys. In step 212, the user logs into an associated application on their nomadic device 140. The user 202 is able to request authorization to the device 140 and request the secret to be downloaded in steps 214. The user 202 is further able to request authorization in step 214 to the vehicle 102. Therefore, only authorized users 202 and devices 140 are able to obtain the pre-shared symmetric key and complete pairing the with vehicle 102.

The nomadic device 140 requests authorization from the distribution server in step 216 and requests the secret in step 220. The authorization provides specific access to authorized devices through assigned keys from the key distribution server 150. That is, only pre-authorized devices are able to access the keys and vehicle 102. In step 222, the distribution server 150 validates the authorization of the nomadic device 140. The distribution server 150 may validate authorizations through an LDAP or similar system. The authorizations may be signed by the owner or primary user of the vehicle 102.

After the authorization is approved, the secret, including the keyID and key, is downloaded to the nomadic device 140 in step 224. After download, the nomadic device 140 may display a pairing or pair request via user interface in step 226. Additionally, the PIN may be displayed or the PIN may be automatically submitted. The nomadic device 140 generates a random 6-digit PIN and displays it in steps 228 and 230. In step 232, the nomadic device 140 and vehicle 102 initiate PAN 142 connection. Any type of PAN 142 connection may be used including a BLUETOOTH Low Energy (BLE) connection. In step 234 the PAN 142 connection is established between the nomadic device 140 and the vehicle 102. In step 235 the nomadic device 140, the user 202, or both request secure pairing. In step 236, the nomadic device 140 sends its keyID to the vehicle 102.

The vehicle 102 retrieves the associated symmetric encryption key from an onboard or offboard repository and sends a pair challenge to the nomadic device 140 in step 238. The pair challenge includes a nonce encrypted with the encryption key associated with the keyID. As such, devices are required to possess the symmetric encryption key associated with the keyID in order to obtain the nonce. It should be appreciated that a nonce is any secret or sufficiently random number that cannot be guessed through collisions or other methods. Both the vehicle 102 and nomadic device 140 calculate a predetermined incrementation to the nonce in step 240. The incrementation may simply add one to the received nonce (e.g., nonce+1). The incremented nonce is sent from the nomadic device 140 to the vehicle 102 along with the random PIN generated by the nomadic device 140 in step 242. That is, the incremented nonce is concatenated with the random PIN to ensure the random PIN is received according to the nonce and not sent independently. Concatenation may include placing the values end to end or interlacing in a predetermined fashion. It should be appreciated that the random PIN may be previously generated or generated as needed. The random PIN may be received by other means. Next, the vehicle 102 compares the received nonce with its own incremented nonce. If the incremented nonce received is equal to the incremented nonce created, the random PIN is pushed to the PAN 142 stack (e.g., BLUETOOTH stack) for pairing and bonding as shown in step 244.

The pairing and bonding establishes a secure connection over the PAN 142. Indeed, a secure connection over the PAN 142 is established and is enabled through symmetrically encrypted PIN exchange. Such backward compatible security allows existing PAN 142 connection protocols and algorithms to be used without compromising security. Any type of PAN 142 protocols or algorithms may be used (e.g., BLUETOOTH, ZIGBEE, Z-WAVE, DASH7). This process does not necessarily replace existing pairing algorithms but instead augments such algorithms by providing a new, secure method of informing the user of the random pairing PIN.

After the secured connection over the secured PAN 142 is established, the nomadic device 140 exchanges a vehicle access or ignition key with the vehicle 102, which was received from the primary vehicle operator or the distribution server 150.

It should be appreciated that the methods and algorithms disclosed herein may be embodied in a decentralized fashion. For example, the distribution server 150 may be removed such that the primary account holder's mobile device directly communicates with the nomadic device 140 disclosed such that the symmetric keys are exchanged through a different PAN or near-field communication device. The primary account holder's mobile device may include multiple keys having predetermined periods of use such that third-parties may gain access to the vehicle over the nomadic device-vehicle PAN 142.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a controller configured to,
responsive to a pair request over a personal network from a nomadic device outside the vehicle, send a nonce encrypted according to a symmetric encryption key, and
responsive to receiving a concatenation of a random key and an incrementation of the nonce encrypted with the symmetric encryption key, initialize a secure connection using the random key and permit vehicle access according to data received via the secure connection, wherein the pair request includes a key identifier associated with the symmetric encryption key at a key distribution server, and further wherein the key distribution server includes a plurality of key identifier and symmetric encryption key pairs associated with the vehicle and available for distribution upon authorization of a primary account holder.

2. The vehicle of claim 1, wherein a cypher associated with the symmetric encryption key includes a signature to verify authenticity of the symmetric encryption key.

3. The vehicle of claim 1, wherein the symmetric encryption key is issued with the vehicle during manufacture.

4. The vehicle of claim 1, wherein the symmetric encryption key is created by the vehicle.

5. The vehicle of claim 1, wherein the personal network is in compliance with Institute of Electrical and Electronics Engineers standard 802.15.

6. The vehicle of claim 1, wherein the nomadic device defines the random key from user input.

7. The vehicle of claim 1, wherein permitting vehicle access includes unlocking doors of the vehicle.

8. The vehicle of claim 1, wherein permitting vehicle access includes activation of the vehicle.

9. A vehicle comprising:
a controller configured to,
responsive to receiving a nonce encrypted according to a symmetric encryption key associated with an identifier, send a predetermined incrementation of the nonce concatenated with a random key encrypted according to the symmetric encryption key, and
responsive to pairing with a device sending the nonce, operate the vehicle according to commands received from a secure connection with the device based on the random key over a personal network.

10. The vehicle of claim 9, wherein the key identifier is associated with the symmetric encryption key at a key distribution server.

11. The vehicle of claim 10, wherein the key distribution server includes a plurality of key identifier and symmetric encryption key pairs associated with the vehicle and available for distribution upon authorization of a primary account holder.

12. The vehicle of claim 9, wherein a cypher associated with the symmetric encryption key includes a signature to verify authenticity of the symmetric encryption key.

13. The vehicle of claim 9, wherein the symmetric encryption key is issued with the vehicle during manufacture.

14. The vehicle of claim 9, wherein the symmetric encryption key is created by the vehicle.

15. The vehicle of claim 9, wherein operation of the vehicle includes unlocking doors of the vehicle.

16. The vehicle of claim 9, wherein operation of the vehicle includes activation of the vehicle.

17. A method comprising:
by a controller of a vehicle, responsive to receiving a pair request over a personal area network from a nomadic device outside the vehicle, sending a nonce encrypted according to a symmetric encryption key, and
responsive to receiving a concatenation of a random key and an incrementation of the nonce, initializing a secure connection using the random key and permit vehicle access according to data received via the secure connection.

* * * * *